US008117626B2

(12) United States Patent
Suzuki et al.

(10) Patent No.: US 8,117,626 B2
(45) Date of Patent: Feb. 14, 2012

(54) ASYNCHRONOUS REMOTE PROCEDURE CALLING METHOD AND COMPUTER PRODUCT IN SHARED-MEMORY MULTIPROCESSOR

(75) Inventors: Takahisa Suzuki, Kawasaki (JP); Hideo Miyake, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 846 days.

(21) Appl. No.: 12/182,846

(22) Filed: Jul. 30, 2008

(65) Prior Publication Data

US 2008/0295120 A1 Nov. 27, 2008

Related U.S. Application Data

(63) Continuation of application No. PCT/JP2006/301533, filed on Jan. 31, 2006.

(51) Int. Cl.
*G06F 3/00* (2006.01)
(52) U.S. Cl. .................................... 719/330; 719/318
(58) Field of Classification Search .................. 719/330, 719/318
See application file for complete search history.

(56) References Cited

U.S. PATENT DOCUMENTS

| 5,781,741 A | 7/1998 | Imamura et al. |
| 6,108,693 A | 8/2000 | Tamura |
| 6,115,803 A | 9/2000 | Hayashi et al. |
| 6,721,941 B1 * | 4/2004 | Morshed et al. .............. 717/127 |
| 7,017,163 B2 * | 3/2006 | Shin et al. ..................... 719/330 |
| 7,337,448 B1 * | 2/2008 | Dalia et al. .................... 719/328 |

FOREIGN PATENT DOCUMENTS

| JP | 5-290003 | 11/1993 |
| JP | 7-311750 A | 11/1995 |
| JP | 08-016540 A | 1/1996 |
| JP | 11-120156 A | 4/1999 |

OTHER PUBLICATIONS

Daniel Andresen, SWEB: Towards a Scalable World Wide Web Server on Multicomputers, 1996.*

* cited by examiner

*Primary Examiner* — Lechi Truong
(74) *Attorney, Agent, or Firm* — Arent Fox, LLP (57) ABSTRACT

A first processor makes a procedure call, specifying an address of a procedure in an address space controlled by a second processor and an address of procedure control information generated in an address space controlled by the first processor. The second processor executes the procedure present at the address specified by the first processor. Upon finishing of execution of the procedure, the second processor returns the address of the procedure control information to the first processor. The first processor changes the execution status included in the procedure control information at the address returned from the second processor from "being executed" to "completed".

8 Claims, 7 Drawing Sheets

FIG.10

ASYNCHRONOUS REMOTE PROCEDURE CALLING METHOD AND COMPUTER PRODUCT IN SHARED-MEMORY MULTIPROCESSOR

CROSS-REFERENCE TO RELATED APPLICATION

This Application is a Continuation of International Application No. PCT/JP2006/301533, having an international filing date of Jan. 31, 2006, the disclosure of which is hereby incorporated in its entirety by reference.

BACKGROUND

The present invention relates to an asynchronous remote procedure calling in a shared-memory multiprocessor.

Figure 6:
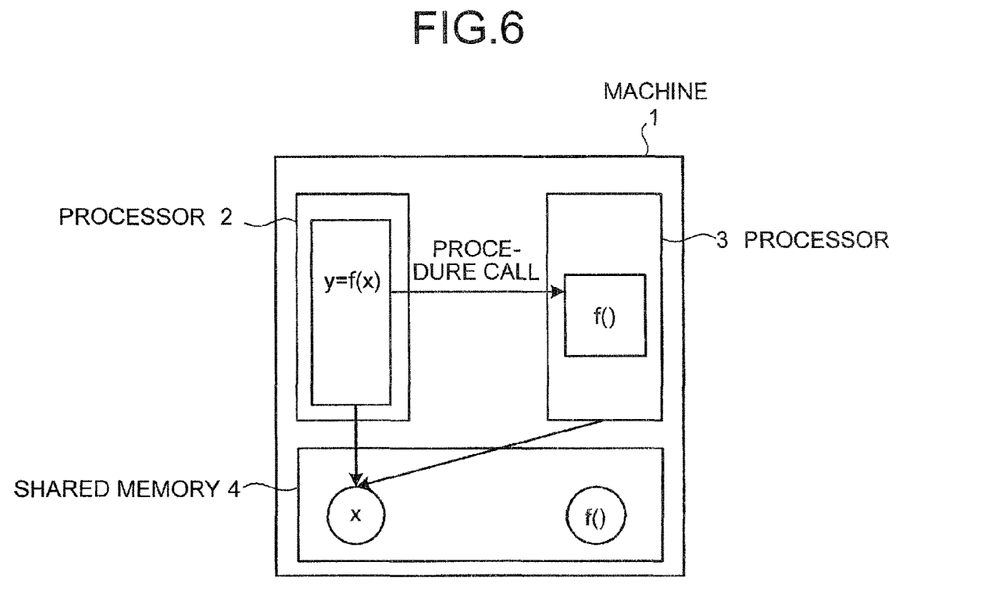
FIG. 6 is a conceptual diagram of a conventional local procedure calling scheme.
Figure 7:
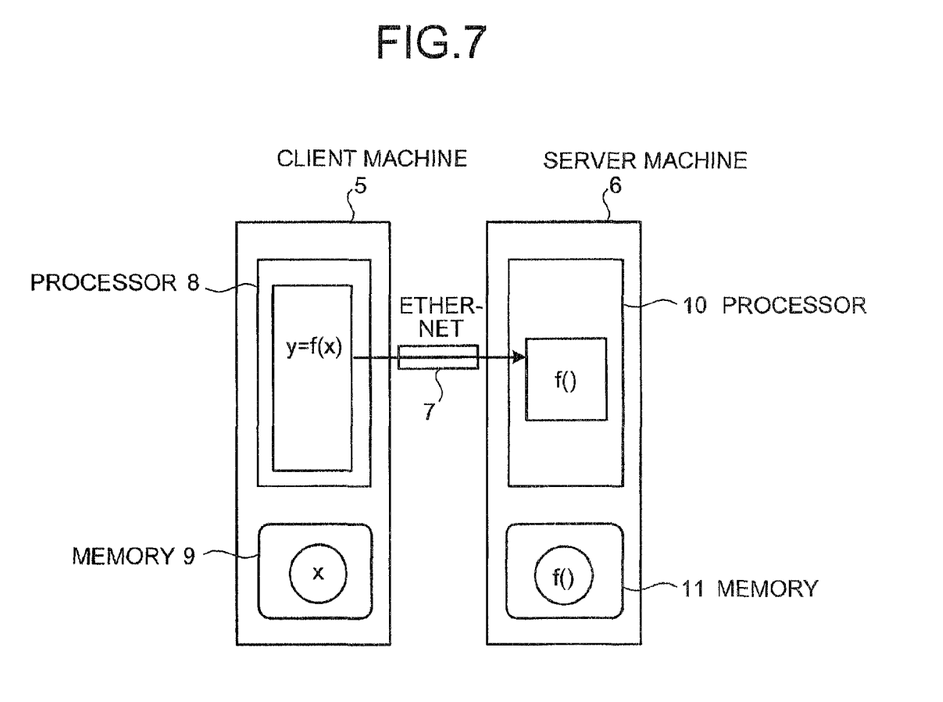
FIG. 7 is a conceptual diagram of a conventional remote procedure calling scheme.

Generally, in a computer system, using plural processors, methods of performing parallel processing by a procedure call include a local procedure calling scheme and a remote procedure calling scheme. FIGS. 6 and 7 are conceptual diagrams of the local procedure calling scheme and the remote procedure calling scheme, respectively. As shown in FIG. 6, the local procedure calling scheme is a method of making the procedure call between a first processor 2 and a second processor 3 that are provided in a common machine (computer) 1 and have a shared-memory 4.

This local procedure calling scheme has an advantage in that communication between the processors 2 and 3 can be performed at a high speed. However, since plural processors 2 and 3 use the same memory area, this scheme has a problem in that as the number of processors increases, conflicts in memory access increase memory access latency and improvements in computer processing efficiency become difficult. As this scheme requires a configuration of controlling coherence of a cache, there is also a problem in that this coherence control mechanism becomes complicated as the number of processors increases.

On the other hand, as shown in FIG. 7, the remote procedure calling scheme is a method of making the procedure call between independent machines 5 and 6 by way of a network 7 such as an Ethernet (registered trademark). In this case, a processor 8 in a client machine 5 uses a memory 9 in the client machine 5. A processor 10 in a server machine 6 uses a memory 11 in the server machine 6. Therefore, the remote procedure calling scheme does not cause the problems of increased memory access latency due to conflicts in memory access and a complicated mechanism for controlling the coherence of the cache, as found with the local procedure calling scheme.

Among the remote procedure calling schemes is an asynchronous remote procedure calling scheme. According to this asynchronous remote procedure calling scheme, the processor requesting the procedure (hereinafter, procedure requesting processor) may cause a different processor to execute plural remote procedures simultaneously. Therefore, the procedure requesting processor, upon receipt of a notification indicating completion of the procedure from the processor executing the procedure (hereinafter, procedure executing processor), must identify to which procedure the notification corresponds among the procedures previously requested by the procedure requesting processor.

Figure 8:
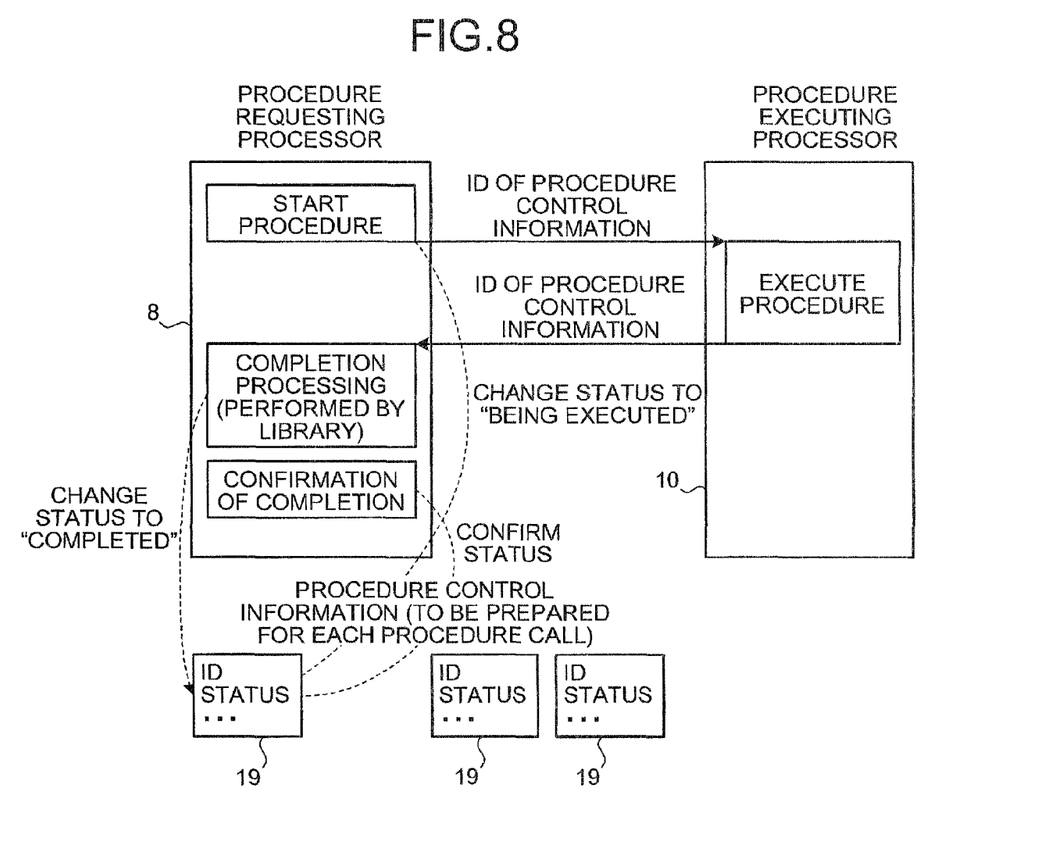
FIG. 8 is a conceptual diagram of a conventional asynchronous remote procedure calling scheme

FIG. 8 is a conceptual diagram of the asynchronous remote procedure calling scheme. As shown in FIG. 8, in the asynchronous remote procedure calling scheme, the procedure requesting processor, namely, the processor 8 in the client machine 5, controls the plural procedures requested of the procedure executing processor, namely, the processor 10 in the server machine 6, by preparing procedure control information 19 with an identifier such as an ID attached thereto for each procedure call. This procedure control information 19 is stored in the memory 9 of the client machine 5.

When the procedure requesting processor makes an asynchronous remote procedure call to the procedure executing processor, the procedure requesting processor informs the procedure executing processor of the ID of corresponding procedure control information 19. The procedure executing processor, upon completion of the requested procedure, returns the ID received at the time of initiation to the procedure requesting processor. The procedure requesting processor, upon return of the ID from the procedure executing processor, performs completion processing and confirms completion.

In the remote procedure calling scheme, in order for the processor 8 in the client machine 5 to make the procedure call to the processor 10 in the server machine 6, the processor 8 in the client machine 5 must specify the address of the corresponding procedure in the memory 11 of the server machine 6. However, since the client machine 5 and the server machine 6 are independent of each other, the processor 8 in the client machine 5 is not capable of knowing the corresponding address in the memory 11 in the server machine 6.

Figure 9:
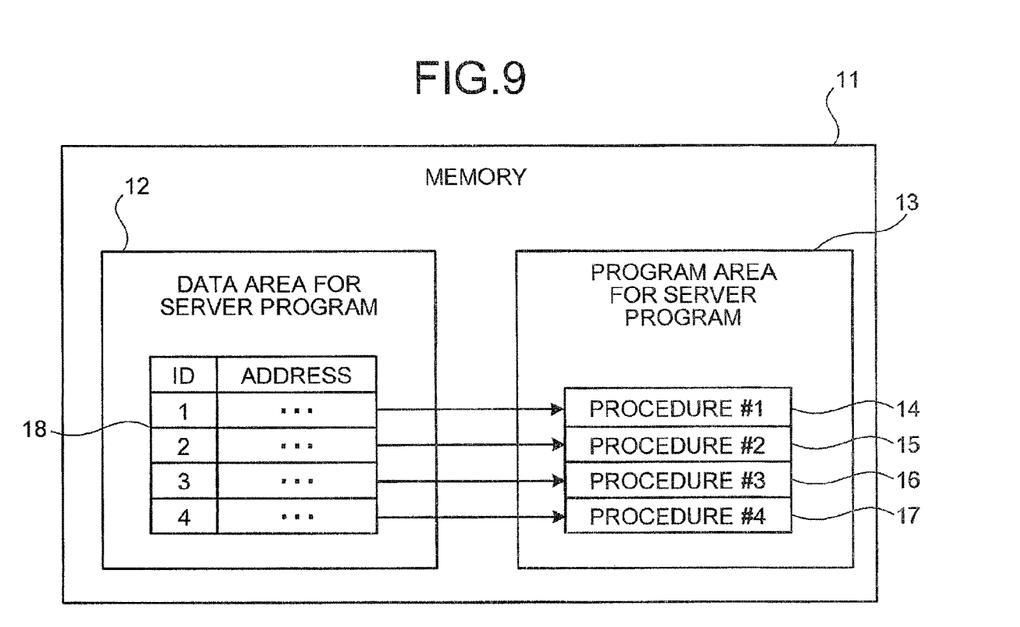
FIG. 9 is a conceptual diagram of a data area and a program area in a memory of a server machine in a conventional remote procedure calling scheme.

Accordingly, in the conventional remote procedure calling scheme, configuration is such that description about the hardware such as the memory is abstracted and the procedure to be called is specified by an identifier such as an ID number. The situation is the same with the asynchronous remote procedure calling scheme. In this case, such as the address space of the memory 11 in the server machine 6 shown in FIG. 9, it is necessary to prepare, at a data area 12 for a server program, a table indicating correspondence between the addresses of procedures 14, 15, 16, and 17 developed in a program area 13 for the server program and identifiers such as the ID numbers. This leads to a problem in that utilization of the memory 11 in the server machine 6 is increased accordingly.

Figure 10:
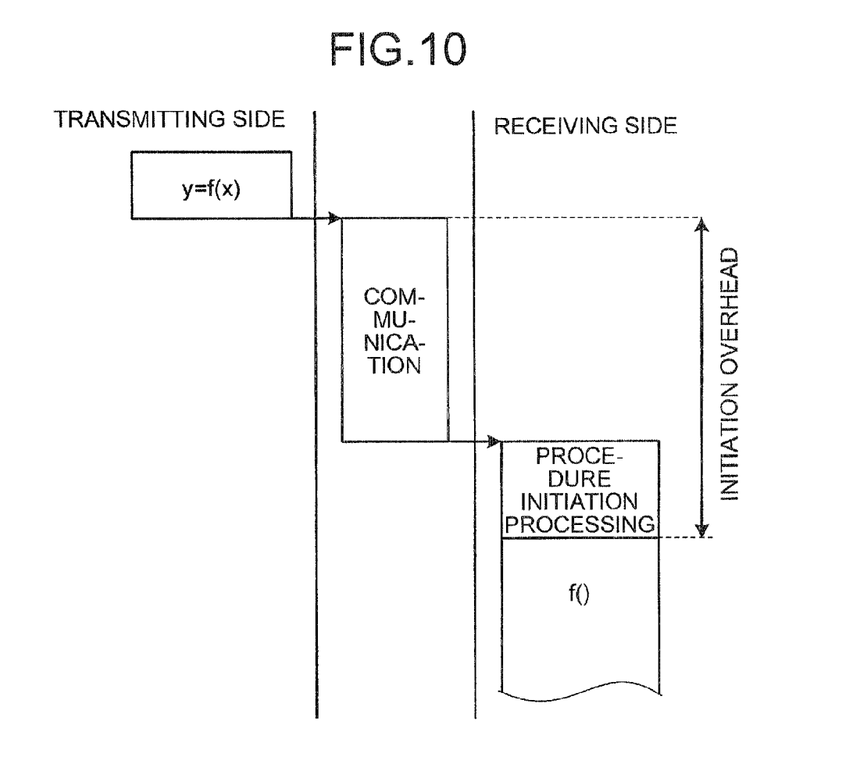
FIG. 10 is a timing diagram concerning procedure initiation in the conventional remote procedure calling scheme.

In the remote procedure calling scheme, inclusive of the asynchronous type, since communication between the machines 5 and 6 is performed using the network 7, the speed of the communication between the processors 8 and 10 is considerably slower as compared with the local procedure calling scheme. Furthermore, on the side of the server machine 6, since it is necessary to search for the address corresponding to the identifier such as the ID number from a table 18, the procedure initiation processing takes time. This causes a problem, as shown in FIG. 10, of a long initiation overhead from the client machine 5 sending the procedure call until the execution of the corresponding procedure at the server machines 6.

Furthermore, in the asynchronous remote procedure calling scheme, when the procedure requesting processor performs the completion processing, the execution status included in the procedure control information 19 must be changed from "being executed" to "completed" using the ID returned by the procedure executing processor. Therefore, at the data area of the memory 9 in the client machine 5, a table indicating correspondence between the address of the procedure control information 19 and the ID must be prepared, leading to a problem in that the utilization of the memory 9 in the client machine 5 is increased accordingly. Furthermore, since it is necessary to search for the address of the procedure control information 19 corresponding to the ID returned by the procedure executing processor, there is a problem in that the completion processing takes time.

The present invention was conceived in light of the above and an object of the present invention is to provide an asynchronous remote procedure calling method in a shared-memory multiprocessor that applies an asynchronous remote procedure calling scheme to communication between plural processors sharing memory and that is capable of reducing memory utilization in a client machine and a server machine and of achieving a higher speed of procedure initiation processing and completion processing. Another object of the present invention is to provide a computer product that causes a computer to execute such an asynchronous remote procedure calling method.

SUMMARY

An asynchronous remote procedure calling method according to one aspect of the present invention is applicable in a shared-memory multiprocessor having processors that are capable inter-processor communication using a bus, share a memory and each have an address space that is respectively independent in the memory, whereby a first processor of the shared-memory multiprocessor makes an asynchronous remote procedure call to a second processor thereof. The asynchronous remote procedure calling method includes generating by the first processor and in the address space controlled by the first processor, procedure control information for controlling a procedure to be executed by the second processor; setting, by the first processor, a procedure status included in the procedure control information as "being executed"; making the asynchronous remote procedure call by the first processor notifying the second processor of an address of the procedure control information; initiating and executing, by the second processor, the procedure in the address space controlled by the second processor and specified by the asynchronous remote procedure call; notifying the first processor of completion of the procedure by the second processor returning the address of the procedure control information to the first processor; and changing, by the first processor, the procedure status, at the address returned by the second processor, to "finished".

An asynchronous remote procedure calling method according to another aspect of the present invention is applicable in a shared-memory multiprocessor having processors that are capable inter-processor communication using a bus, share a memory and each have an address space that is respectively independent in the memory, whereby a first processor of the shared-memory multiprocessor makes an asynchronous remote procedure call to a second processor thereof. The asynchronous remote procedure calling method includes generating by the first processor and in the address space controlled by the first processor, procedure control information for controlling a procedure to be executed by the second processor; setting, by the first processor, a procedure status included in the procedure control information as being "executed"; making the asynchronous remote procedure call by the first processor notifying the second processor of an address of the procedure control information; and changing, by the first processor, the procedure status to "finished" after execution of the procedure by the second processor.

An asynchronous remote procedure calling method according to still another aspect of the present invention is applicable in a shared-memory multiprocessor having processors that are capable inter-processor communication using a bus, share a memory and each have an address space that is respectively independent in the memory, whereby a first processor of the shared-memory multiprocessor makes an asynchronous remote procedure call to a second processor thereof. The asynchronous remote procedure calling method includes receiving, by the second processor and from the first processor, an address of procedure control information that is for controlling a procedure to be executed by the second processor and is in the address space controlled by the first processor; initiating and executing, by the second processor, the procedure in the address space controlled by the second processor and specified by the asynchronous remote procedure call; and notifying the first processor of completion of the procedure by the second processor notifying the first processor of the address of the procedure control information.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Referring to the accompanying drawings, exemplary embodiments according to the present invention are explained in detail below. The present invention is not limited by the embodiments. Furthermore, multiprocessor configuration includes a configuration in which plural processors are provided on one integrated circuit (IC) chip and one in which, among plural IC chips, one or more processors is/are provided on each of the IC chips.

Figure 1:
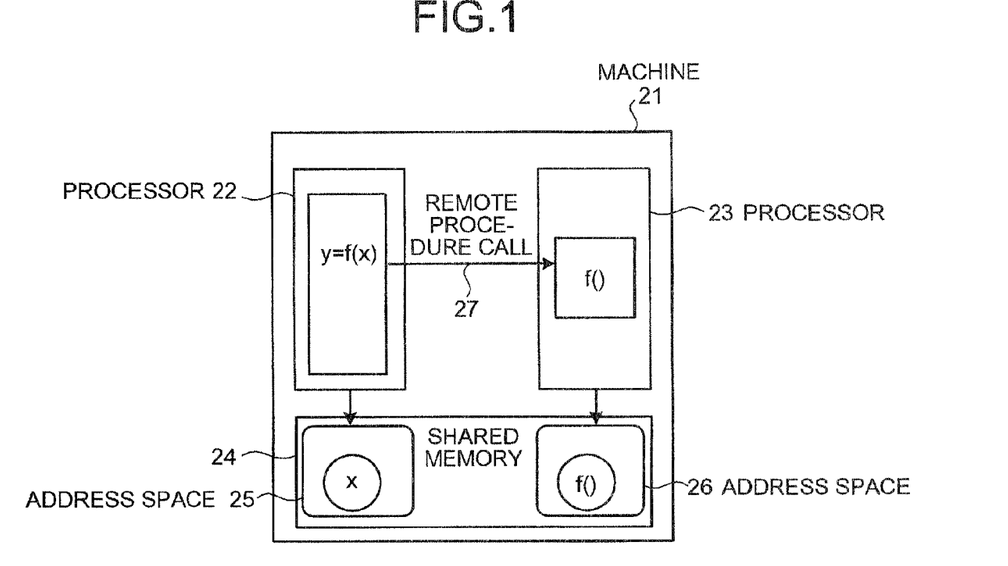
FIG. 1 is a conceptual diagram of an asynchronous remote procedure calling method according to the present invention.

FIG. 1 is a conceptual diagram of an asynchronous remote procedure calling method in a shared-memory multiprocessor according to the present invention. As shown in FIG. 1, a first processor 22 and a second processor 23 provided in the same machine, a machine (computer) 21, physically share the same memory, a shared memory 24. An address space 25 controlled by the first processor 22, and an address space 26 controlled by the second processor 23, of the shared memory 24 are independent of each other.

This configuration enables a procedure call to be made by applying the asynchronous remote procedure calling method between the first processor 22 and the second processor 23. In such procedure call, it is not necessary to abstract an address of the memory by an identifier as done in the conventional asynchronous remote procedure calling scheme. Therefore, the first processor 22, by specifying the address of the address space 26 controlled by the second processor 23, makes the asynchronous remote procedure call by way of inter-processor communication 27. The use of a bus for the inter-processor communication 27 similarly enhances the speed of the communication between the processors as with a local procedure call.

Since the second processor 23 called by the procedure call is not required to search for the address corresponding to the identifier in procedure initiation processing, the time required for the procedure initiation processing is reduced. The higher communication speed and the shorter time for the procedure initiation processing shortens the initiation overhead from the first processor 22 notifying the second processor 23 of the procedure call until the second processor 23 initiates execution of the corresponding procedure, enabling high speed initiation of the execution of the remote procedure.

Since a table indicating correspondence between the identifier and the address is not necessary, the utilization of the shared memory 24 may be reduced. Furthermore, since the independence of the address spaces 25 and 26 simplifies control of coherence of a cache memory and control of conflict of memory access, processing efficiency of the computer is enhanced even if the number of processors sharing the same memory is increased to 3 or more.

The first processor 22 prepares procedure control information in the address space 25 and gives the address of the procedure control information to the second processor 23. The second processor, upon completion of the requested procedure, returns the address received at the time of initiation to the first processor 22. The first processor 22 performs completion processing by changing the execution status included in the procedure control information from "being executed" to "completed" at the address returned. Therefore, since the first processor 22 is not required to search for the address corresponding to an ID of the procedure control information, the time needed for the completion processing is reduced. Since a table that sets correspondence between the ID and the address of the procedure control information is not necessary, utilization of the shared memory 24 can be reduced.

Figure 2:
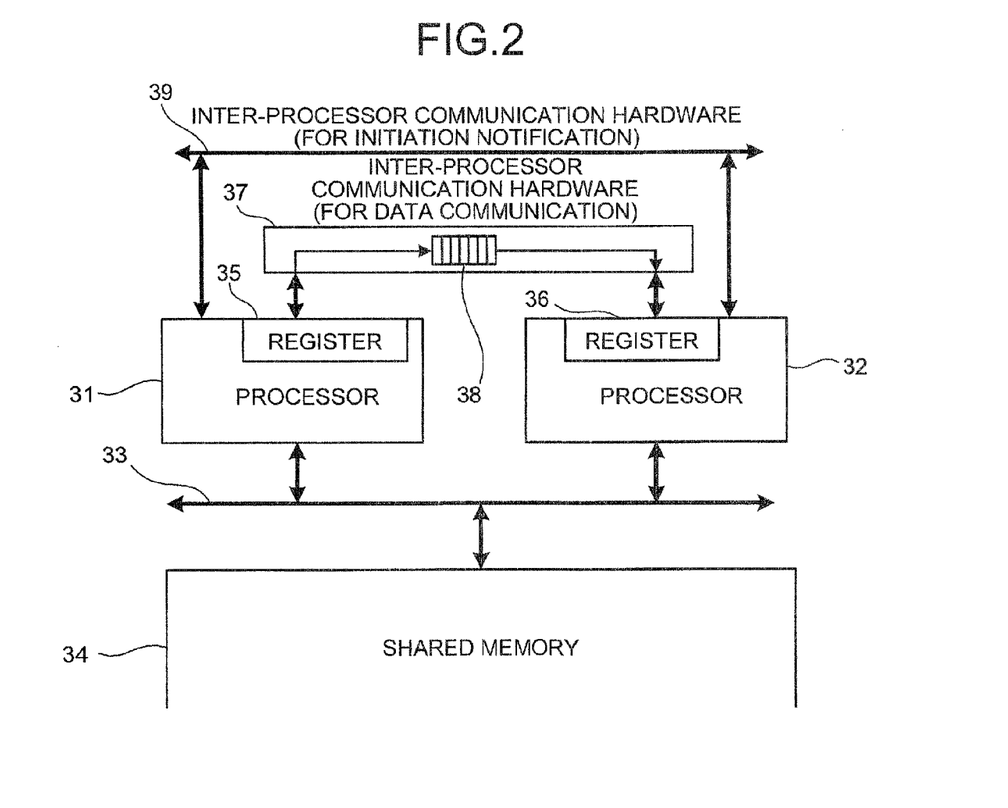
FIG. 2 is a block diagram of essential elements of a hardware configuration according to a first embodiment.

FIG. 2 is a block diagram of essential elements of a hardware configuration according to the first embodiment. As shown in FIG. 2, a first processor 31 and a second processor 32 are connected to a shared memory 34 by way of a bus 33 and physically share the shared memory 34. The first processor 31 has a communication register 35 to which the address of a procedure to be called and the address of procedure control information controlling this procedure are written. The second processor 32 has a communication register 36 to which the address of the procedure called and the address of the procedure control information controlling this procedure are written.

The communication register 35 of the first processor 31 and the communication register 36 of the second processor 32 are connected to inter-processor communication hardware 37 for data communication, using a bus. This inter-processor communication hardware 37 for data communication has queued data buffers 38 provided therein such that plural data items can be communicated between the communication register 35 of the first processor 31 and the communication register 36 of the second processor 32. The first processor 31 and the second processor 32 are connected to inter-processor communication hardware 39 for initiation notification, using a bus.

Figure 3:
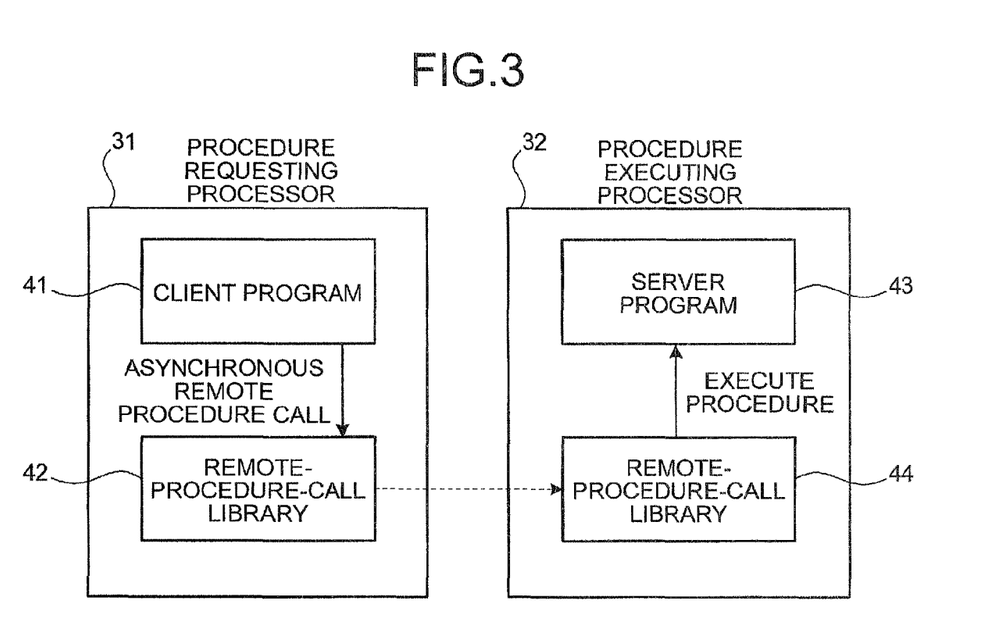
FIG. 3 is a conceptual diagram for explaining software configuration.

FIG. 3 is a conceptual diagram for explaining software configuration. As shown in FIG. 3, a procedure calling processor, namely, the first processor 31 in the embodiment above, has a client program 41 and a library for asynchronous-remote-procedure-calling (remote-procedure-call library) 42. Meanwhile, the second processor 32, as a procedure executing processor, has a server program 43 and a library for asynchronous-remote-procedure calling (remote-procedure-call library) 44. In the first processor 31, when the client program 41 requests the remote-procedure-call library 42 to make the asynchronous remote procedure call, the procedure requested by the library is executed in the second processor 32.

Figure 4:
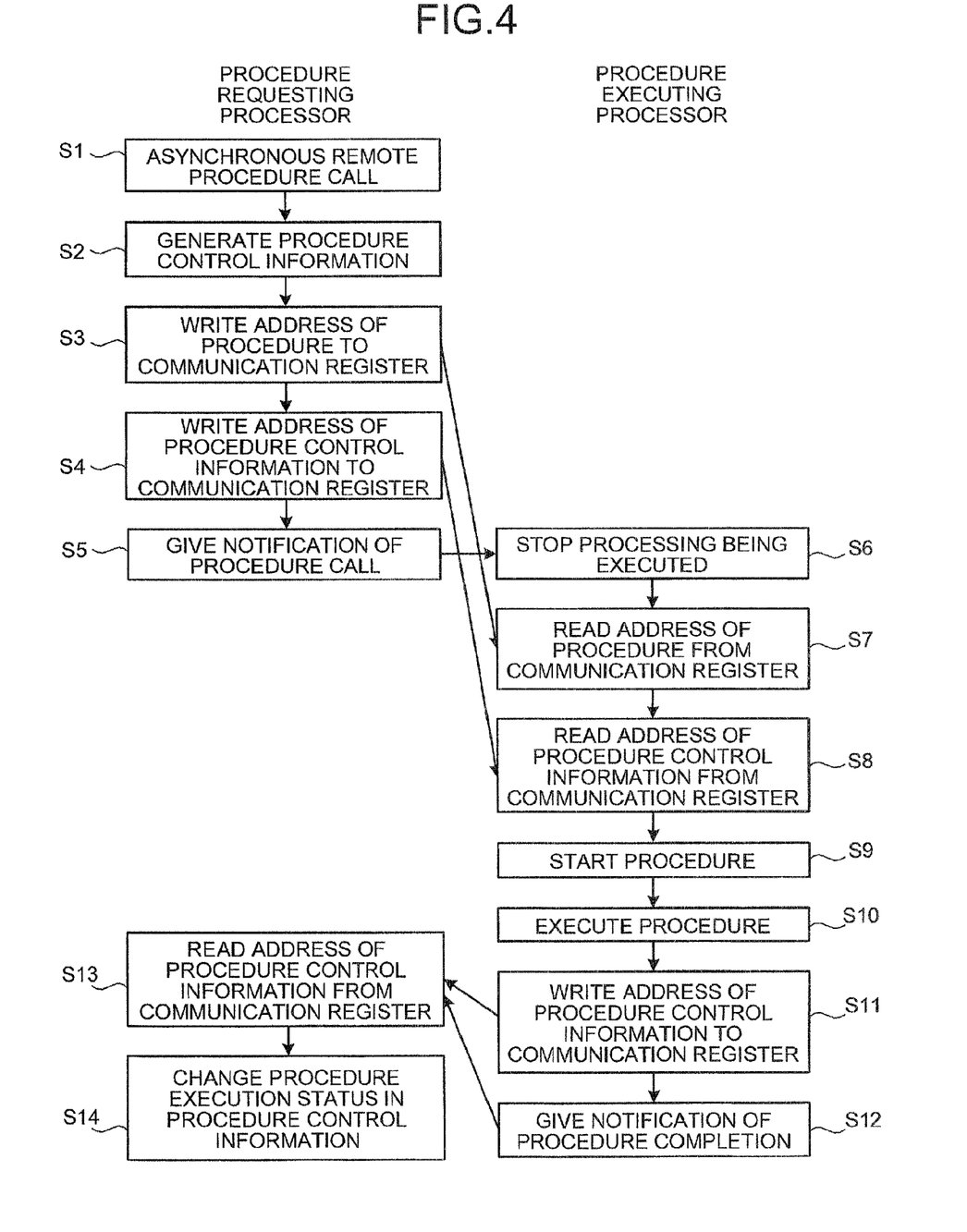
FIG. 4 is a flowchart of a procedure calling method according to the first embodiment.

FIG. 4 is a flowchart of the procedure calling method according to the first embodiment. As shown in FIG. 4 the client program 41, in the first processor 31, requests the remote-procedure-call library 42 to make the asynchronous remote procedure call (step S1). As a result the remote-procedure-call library 42, in the first processor 31, generates the procedure control information at the address space controlled by the first processor 31 and sets the procedure execution status included in the control information as "being executed" (step S2). Next, the remote-procedure-call library 42 writes the address of the requested procedure in the communication register 35 of the first processor 31 (step S3). Then, the remote-procedure-call library 42, in the first processor 31, writes the address of the procedure control information in the communication register 35 of the first processor 31 (step S4).

Contents written in the communication register 35 of the first processor 31 are sequentially stored in the data buffers 38 provided in the inter-processor communication hardware 37 for data communication. The address of the procedure firstly stored in the data buffers 38 is transferred to and written in the communication register 36 of the second processor 32. Then, the remote-procedure-call library 42, in the first processor 31, notifies the second processor 32 of the procedure call (step S5).

The second processor 32, upon receipt of the notification of the procedure call from the first processor 31, stops the processing being executed (step S6). Then, the remote-procedure-call library 44 of the second processor 32 reads the address of the procedure from the communication register 36 of the second processor 32 (step S7) and by doing so, the address of the procedure control information stored in the data buffers 38 is transferred to and written in the communication register 36 of the second processor 32, and hence, the remote-procedure-call library 44 of the second processor 32 reads the address of the procedure control information from the communication register 36 of the second processor 32 (step S8). Then, the remote-procedure-call library 44 of the second processor 32 performs procedure initiation processing (step S9) and the procedure is executed by the server program 43 of the second processor 32 (step S10).

Upon completion of the procedure, the remote-procedure-call library 44 of the second processor 32 writes the address of the procedure control information received from the first processor 31 at the time of initiation of the procedure in the communication register 36 of the second processor 32 (step S11). The address written in the communication register 36 of the second processor 32 is transferred to and written in the communication register 35 of the first processor 31 by way of the inter-processor communication hardware 37 for data communication. Then, in the second processor 32, the remote-procedure-call library 44 notifies the first processor 31 of the completion of the procedure (step S12).

The remote-procedure-call library 42 of the first processor 31, upon receipt of the notification of completion of the procedure from the second processor 32, reads the address of the procedure control information from the communication register 35 of the first processor 31 (step S13). Then, the remote-procedure-call library 42 of the first processor 31 changes the procedure execution status included in the procedure control information stored at the address read from the communication register 35 from "being executed" to "completed" (step S14). When the client program 41 of the first processor 31 performs confirmation of the completion of the procedure, the remote-procedure-call library 42 of the first processor returns the execution status included in the corresponding procedure control information to the client program 41.

Figure 5:
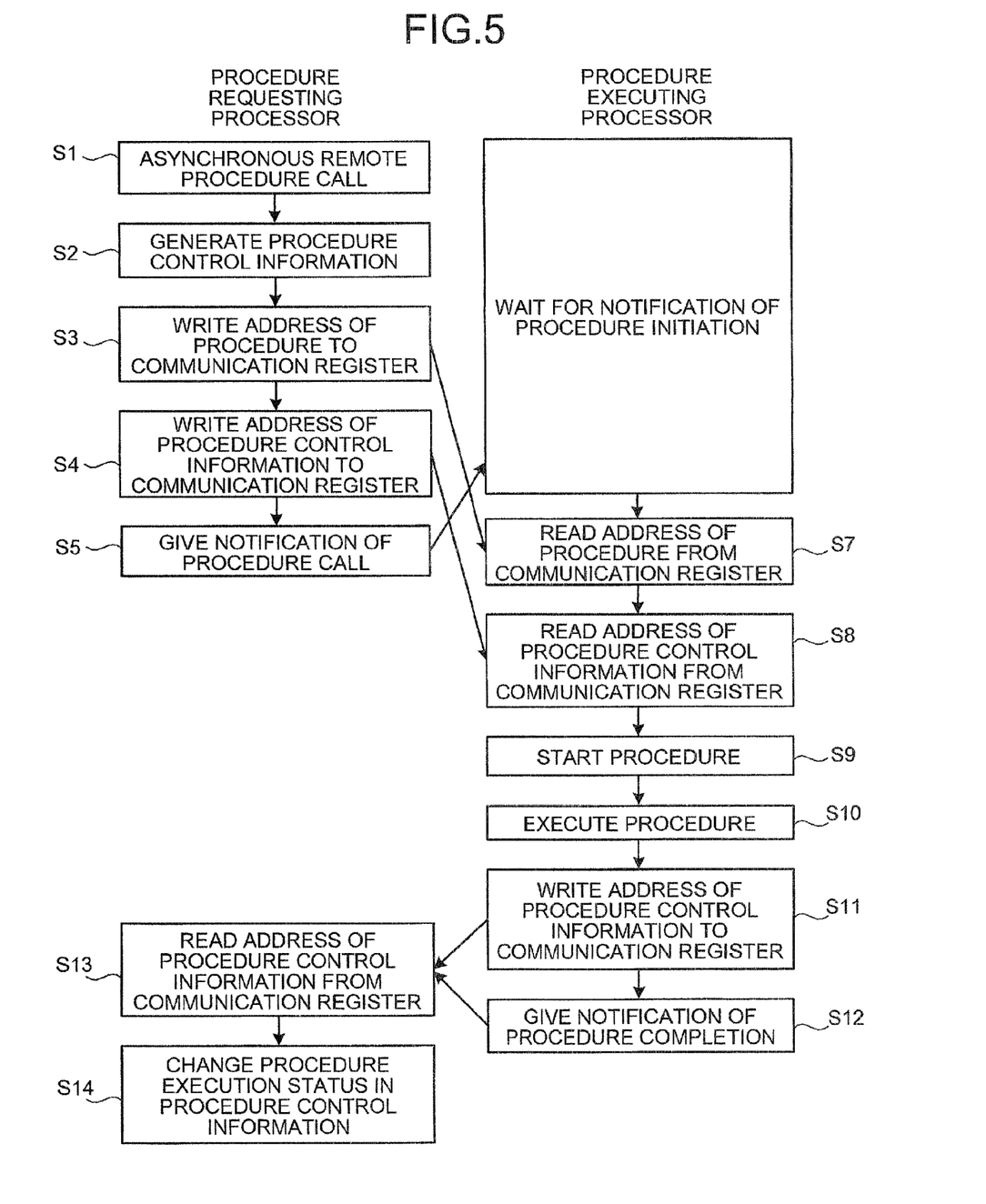
FIG. 5 is a flowchart of the procedure calling method according to a second embodiment.

As the hardware configuration and the software configuration according to the second embodiment are identical to that of the first embodiment, description thereof is omitted. FIG. 5 is a flowchart of the procedure calling method according to the second embodiment. As shown in FIG. 5, the second processor 32 continuously waits for procedure initiation notification from the other processor (step S21). In this state, in the same manner as in the first embodiment, the first processor 31 specifies the address of the procedure and the address of the procedure control information and notifies the second processor 32 of the procedure call (steps S1 to S5) and the second processor 32, upon receipt of the notification of the procedure call from the first processor 31, releases the procedure initiation notification waiting state of step S21.

Then, the second processor 32, in the same manner as in the first embodiment, reads in the address of the procedure and the address of the procedure control information from the communication register 36 of the second processor 32 (steps S7 and S8), performs the procedure initiation processing, and executes the procedure (steps S9 and S10). Upon completion of the procedure, the remote-procedure-call library 44 of the second processor 32 writes the address of the procedure control information received from the first processor 31 at the time of initiation of the procedure in the communication register 36 of the second processor 32 (step S11) and gives notification of the completion of the procedure (step S12). The first processor 31, upon receipt of the notification of the completion of the procedure from the second processor 32, reads the address of the procedure control information from the communication register 35 of the first processor 31 (step S13) and changes the procedure execution status included in the procedure control information stored at the address from "being executed" to "completed" (step S14).

In the first or second embodiment, configuration may be such that the data buffers 38 are not provided at the inter-processor communication hardware 37 for data communication. Further, configuration may be such that, instead of providing the inter-processor communication hardware 37 for data communication, a data communication area to be used for the data communication between the processors is provided in the shared memory 34 shared by the first processor 31 and the second processor 32, where the first processor 31 and the second processor 32 use this data communication area for exchanging the address of the procedure and the address of the procedure control information.

The embodiments described above enable the processor called by the asynchronous remote procedure call to directly initiate the procedure present at the address specified by the calling processor, thereby enabling a reduction in the time required for the procedure initiation processing and high speed initiation of the procedure, without a need for processing to search for the address corresponding to an identifier as is required in the procedure initiation processing of the conventional remote procedure calling scheme. The embodiments described above further enable high speed execution of the completion processing through specification of the procedure control information by the address instead of an ID, without a need for the processing to search for the address corresponding to the ID as is required in the completion processing of the conventional asynchronous remote procedure calling scheme. Furthermore, as neither a table indicating correspondence between the address of the procedure and the identifier nor a table indicating correspondence between the address of the procedure control information and the ID is required, the embodiments enable a reduction in memory utilization.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An asynchronous remote procedure calling method in a shared-memory multiprocessor having processors that are capable of inter-processor communication using a bus, share a memory and each have an address space that is respectively independent in the memory, whereby a first processor of the shared-memory multiprocessor makes an asynchronous remote procedure call to a second processor thereof, the asynchronous remote procedure calling method comprising:
   generating by the first processor and in the address space controlled by the first processor, procedure control information for controlling a procedure to be executed by the second processor;
   setting, by the first processor, a procedure status included in the procedure control information as being executed;
   making the asynchronous remote procedure call by the first processor notifying the second processor of an address of the procedure control information;
   initiating and executing, by the second processor, the procedure in the address
   space controlled by the second processor and specified by the asynchronous remote procedure call;
   receiving, by the second processor and from the first processor, an address in the address space controlled by the second processor; and
   initiating and executing the procedure present at the address by the second processor;
   stopping processing being executed by the second processor upon receipt of notification of the asynchronous remote procedure call; and
   initiating, by the second processor, processing for executing the procedure called by the first processor;
   notifying the first processor of completion of the procedure by the second processor returning the address of the procedure control information to the first processor; and
   changing, by the first processor, the procedure status, at the address returned by the second processor, to finished.

2. The asynchronous remote procedure calling method according to claim 1, wherein
   the making the asynchronous remote procedure call includes specifying, by the first processor, an address in the address space controlled by the second processor.

3. The asynchronous remote procedure calling method according to claim 1 further comprising:
   waiting, by the second processor, for notification of the procedure call to be sent; and
   initiating, by the second processor upon receipt of the notification from the first processor, processing for executing the procedure called by the first processor.

4. The asynchronous remote procedure calling method according to claim 1 further comprising:

writing, by the first processor, the address of the procedure control information to a first register in the first processor; and reading, by the second processor, the address of the procedure control information transferred from the first register via the inter-processor communication and written to a second register in the second processor.

5. An asynchronous remote procedure calling method in a shared-memory multiprocessor having processors that are capable of inter-processor communication using a bus, share a memory and each have an address space that is respectively independent in the memory, whereby a first processor of the shared-memory multiprocessor makes an asynchronous remote procedure call to a second processor thereof, the asynchronous remote procedure calling method comprising:

generating by the first processor and in the address space controlled by the first processor, procedure control information for controlling a procedure to be executed by the second processor;

setting, by the first processor, a procedure status included in the procedure control information as being executed;

making the asynchronous remote procedure call by the first processor notifying the second processor of an address of the procedure control information; and initiating and executing, by the second processor, the procedure in the address space controlled by the second processor and specified by the asynchronous remote procedure call;

receiving, by the second processor and from the first processor, an address in the address space controlled by the second processor; and initiating and executing the procedure present at the address by the second processor;

stopping processing being executed by the second processor upon receipt of notification of the asynchronous remote procedure call; and initiating, by the second processor, processing for executing the procedure called by the first processor;

notifying the first processor of completion of the procedure by the second processor returning the address of the procedure control information to the first processor; and changing, by the first processor, the procedure status to finished after execution of the procedure by the second processor.

6. The asynchronous remote procedure calling method according to claim 5, wherein the making the asynchronous remote procedure call includes specifying, by the first processor, an address in the address space controlled by the second processor.

7. An asynchronous remote procedure calling method in a shared-memory multiprocessor having processors that are capable of inter-processor communication using a bus, share a memory and each have an address space that is respectively independent in the memory, whereby a first processor of the shared-memory multiprocessor makes an asynchronous remote procedure call to a second processor thereof, the asynchronous remote procedure calling method comprising:

generating by the first processor and in the address space controlled by the first processor, procedure control information for controlling a procedure to be executed by the second processor;

setting, by the first processor, a procedure status included in the procedure control information as being executed;

making the asynchronous remote procedure call by the first processor notifying the second processor of an address of the procedure control information; and initiating and executing, by the second processor, the procedure in the address space controlled by the second processor and specified by the asynchronous remote procedure call;

receiving, by the second processor and from the first processor, the address of procedure control information that is for controlling the procedure to be executed by the second processor and is in the address space controlled by the first processor;

initiating and executing, by the second processor, the procedure in the address space controlled by the second processor and specified by the asynchronous remote procedure call; and stopping processing being executed by the second processor upon receipt of notification of the asynchronous remote procedure call; and initiating, by the second processor, processing for executing the procedure called by the first processor;

notifying the first processor of completion of the procedure by the second processor notifying the first processor of the address of the procedure control information;

changing, by the first processor, the procedure status to finished after execution of the procedure by the second processor.

8. The asynchronous remote procedure calling method according to claim 7 further comprising:

waiting, by the second processor, for notification of the procedure call to be sent; and initiating, by the second processor upon receipt of the notification from the first processor, processing for executing the procedure called by the first processor.

* * * * *